United States Patent
Podsiadlik et al.

(10) Patent No.: US 12,182,578 B2
(45) Date of Patent: Dec. 31, 2024

(54) SHARED FUNCTION CONTAINER ACROSS SERVERLESS PLATFORMS TO MITIGATE COLD START PERFORMANCE PENALTIES

(71) Applicant: Dell Products L.P., Round Rock, TX (US)

(72) Inventors: Tomasz Podsiadlik, Dublin (IE); Joel Christner, El Dorado Hills, CA (US); John Power, Kinsale (IE); Patricia Quill, Ballincollig (IE)

(73) Assignee: Dell Products L.P., Round Rock, TX (US)

( * ) Notice: Subject to any disclaimer, the term of this patent is extended or adjusted under 35 U.S.C. 154(b) by 67 days.

(21) Appl. No.: 18/154,801

(22) Filed: Jan. 14, 2023

(65) Prior Publication Data

US 2024/0241726 A1    Jul. 18, 2024

(51) Int. Cl.
    G06F 9/44        (2018.01)
    G06F 9/4401      (2018.01)

(52) U.S. Cl.
    CPC ................ *G06F 9/4401* (2013.01)

(58) Field of Classification Search
    CPC .................................... G06F 9/4401
    See application file for complete search history.

(56) References Cited

U.S. PATENT DOCUMENTS

| | | | |
|---|---|---|---|
| 11,755,380 B1* | 9/2023 | Goulet | G06Q 10/10 |
| | | | 709/203 |
| 2020/0081745 A1* | 3/2020 | Cybulski | G06F 9/545 |
| 2021/0320980 A1* | 10/2021 | Wells | G06F 9/505 |
| 2024/0095091 A1* | 3/2024 | Christner | G06F 9/45558 |

OTHER PUBLICATIONS

D. Balla, M. Maliosz and C. Simon, Open Source FaaS Performance Aspects, 2020 43rd International Conference on Telecommunications and Signal Processing (TSP), 2020; https://ieeexplore.ieee.org/document/9163456 [ieeexplore.ieee.org].
A. Palade, A. Kazmi and S. Clarke, An Evaluation of Open Source Serverless Computing Frameworks Support at the Edge, 2019 IEEE World Congress on Services (Services), 2019; https://ieeexplore.ieee.org/document/8817155 [ieeexplore.ieee.org].
Introduction, documentation, references; https://docs.openfaas.com/ [docs.openfaas.com].
Allex Ellis Allex Ellis , Dude where's my coldstart?, OpenFaaS blog; https://www.openfaas.com/blog/what-serverless-coldstart/ [openfaas.com].
Apache OpenWhisk documentation; https://openwhisk.apache.org/documentation.html [openwhisk.apache.org].

\* cited by examiner

*Primary Examiner* — Zahid Choudhury
(74) *Attorney, Agent, or Firm* — Workman Nydegger (57) ABSTRACT

Shared function execution mitigates cold start penalties for execution units. When a serverless platform receives a request, the request is performed when the serverless platform has a warm execution unit for the request. If a warm execution unit is not available or running, the serverless platform may send the request to another serverless platform rather than cold start an execution unit. The cold start is performed when the warm execution unit is not available at other platforms.

20 Claims, 7 Drawing Sheets

SHARED FUNCTION CONTAINER ACROSS SERVERLESS PLATFORMS TO MITIGATE COLD START PERFORMANCE PENALTIES

FIELD OF THE INVENTION

Embodiments of the present invention generally relate to executing requests in computing environments. More particularly, at least some embodiments of the invention relate to systems, hardware, software, computer-readable media, and methods for mitigating cold start performance penalties in computing environments including serverless platforms.

BACKGROUND

Cloud computing or cloud services, such as function as a service (FaaS) or serverless frameworks, provide a lot of advantages. FaaS, for example, allows an organization to execute functions without having to operate and manage a virtual or physical server. Instead, the physical hardware, the operating system, and web management software are handled by an FaaS or serverless framework provider.

Many of these providers use containers as the execution units in their services. When a request from a user is received, the request (or function) is performed by a container and the results are provided to the requesting user. If a container with a desired runtime is already initialized, the request may be provided to the running container. If a container with the desired runtime is not initialized, the FaaS or serverless platform will initialize the appropriate container.

The requirement to instantiate or initialize a container, however, can impact performance. More specifically, the time required to provide a response is lengthened by the time required to instantiate the container. The term "cold start" describes, by way of example, a process of instantiating a new container to invoke a function when an already-running suitable container is not available. Unfortunately, the response time experienced by the user is increased.

From the FaaS or serverless platform perspective, the need to perform multiple cold starts can impact efficiency. Environments with both cold starts and short-lived function execution times can be inefficient from a resource and energy consumption perspective.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to executing requests, such as functions or processes, in computing environments or systems. More particularly, at least some embodiments of the invention relate to systems, hardware, software, computer-readable media, and methods for improving execution times of functions in computing environments, which may include mitigating the adverse impact of cold starts on the time required to execute functions.

Cold starts can adversely impact the performance of computing systems such as FaaS and serverless platforms (generally referred to as serverless platforms herein). When a serverless platform receives a request, which typically invokes a function, the response time is generally close to the execution time when the request can be performed from a warm start (e.g., a running instance of a container). The response time in the context of a cold start is the execution time plus the time required to create the container. From the perspective of the user, these response times T are represented by:

$$T_{Response-Warm\ Start} \cong T_{Execution}$$

$$T_{Response-Cold\ Start} \cong T_{Create\ Container} + T_{Execution}.$$

However, cold starts (especially when many cold starts are experienced and execution times are short) leads to the inefficient use of computing resources from the perspective of the provider of the serverless platform. Creating a container, for example, consumes processing and memory resources. This prevents those resources from being used to execute requests or functions. The efficiency may be represented as:

$$\text{Efficiency} \propto \frac{T_{Execution}}{T_{Create\ Container} + T_{Execution}}.$$

Conventionally, the lengthened response times and lower efficiencies are reduced by reducing the number of libraries, preloading dependencies, reducing setup variables, avoiding large functions, using functions with high cohesion and low coupling, and reducing the number of HTTPS calls created inside a function. Embodiments of the invention reduce response times (e.g., avoid container creation times or cold start penalties) and improve resource usage efficiencies.

Figure 1:
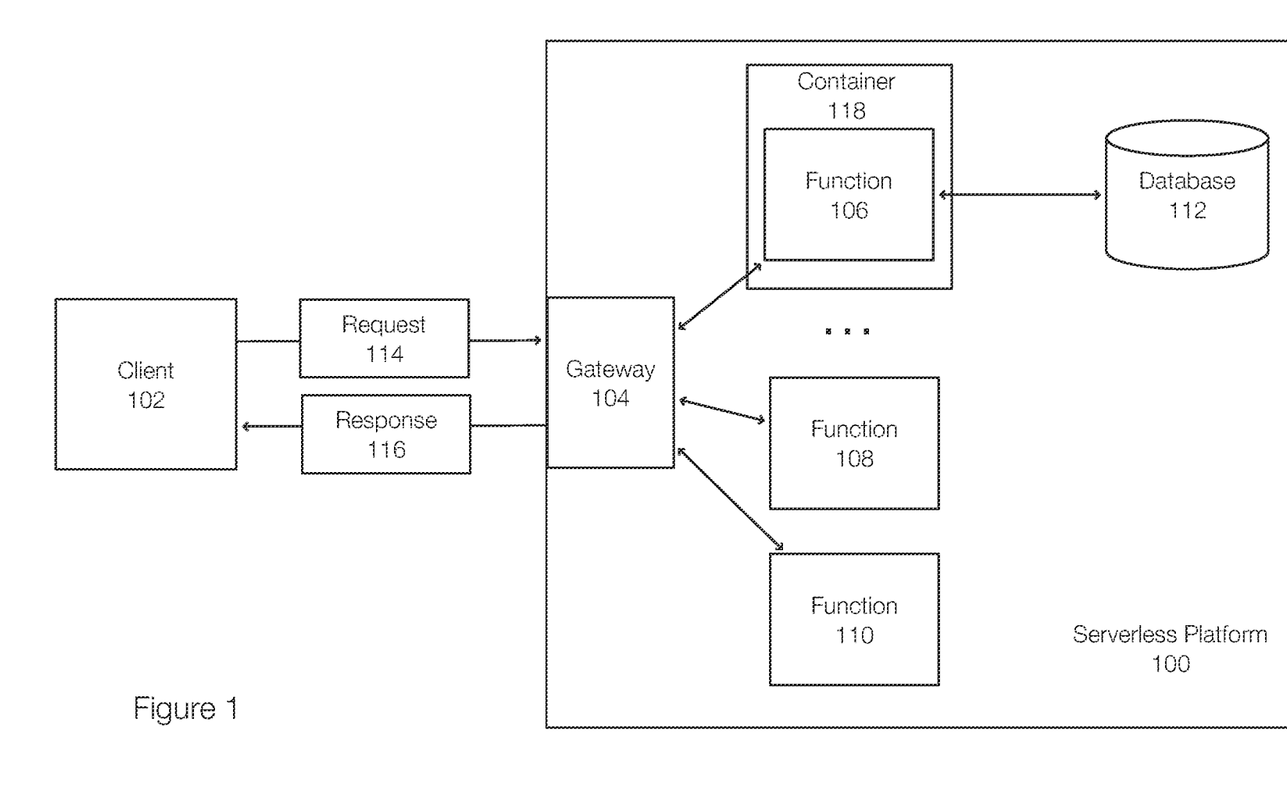
FIG. 1 discloses aspects of reducing response time in a serverless platform.

FIG. 1 illustrates aspects of a serverless platform in which the penalty of cold starts is reduced or mitigated. FIG. 1 illustrates a serverless platform 100 (e.g., an FaaS platform) configured to execute requests. The serverless platform 100 executes functions, represented by functions 106, 108, and 110, using server computers, containers, virtual machines, or the like. In some instances, a function 106 may access a database 112 or other datastore or require another service.

More specifically, a client 102 sends a request 114, which may be received at a gateway 104 (e.g., a gateway API (application programming interface), a URL (Uniform Resource Locator)) or the like. The gateway 104 may direct the request to a specific function, such as the function 106, which may be identified in the request 114. The function 106 executes and a response 116 may be returned to the client 102.

The execution unit in the serverless platform 100 may be a container 118 (or specific code or executable). The function 106 executes in or is executed by the container 118. If the container 118 exists when the request 114 is received, a warm start scenario is present. If the container 118 does not exist but needs to be instantiated to perform the function 106, a cold start scenario is present.

Figure 2:
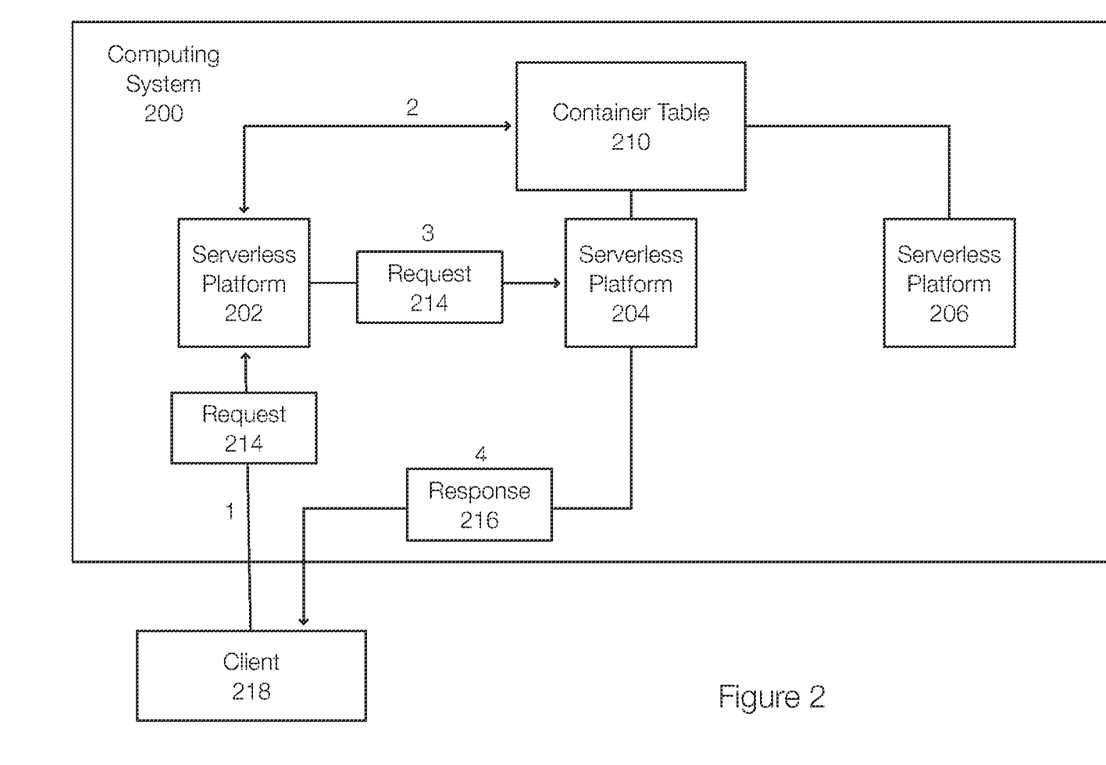
FIG. 2 discloses aspects of mitigating cold start penalties in serverless platforms.

FIG. 2 discloses aspects of mitigating cold start penalties. FIG. 2 discloses a computing system 200 that includes hardware such as processors, memory, networking hardware, and other hardware. The computing system 200 may be implemented in a cloud or edge environment. The computing system 200 supports or includes serverless platforms, represented by the serverless platforms 202, 204, and 206. The serverless platforms 202, 204, and 206 may exist in the same computing system or location (e.g., same factory, university, cloud, datacenter, shared server rack). The serverless platforms 202, 204, and 206 may be of the same or different. Example serverless platforms include, but are not limited to, OpenFaaS, Knative, OpenWhisk, or the like. In one example, these serverless platforms 202, 204, and 206 may be different and independent deployments, but may use the same execution unit, such as a container.

In one example, the serverless platforms 202, 204, and 206 in the computing system use the same network. However, embodiments of the invention are not limited to serverless platforms using the same network and may be exposed to the Internet. Thus, the computing system 200 may include localized hardware (e.g., same location) or geographically separated hardware.

To mitigate request response time T, which essentially corresponds to the time between submitting a request 214 and receiving a response 216, the computing system 200 (or one of the serverless platforms or other entity) may implement a container table 210. The container table 210 allows the serverless platform 202 to determine whether another serverless platform has a running container of the desired type or is otherwise compatible with the desired container (herein simply referred to as "container"). More specifically, the container table 210 may identify the containers instantiated in other serverless platforms. In one embodiment, the container table 210 may include information such as information on runtime, container type, or the like. This allows the compatibility of the request 214 and the containers identified in the container table 210 to be determined.

When the request 214, which may include a function to be executed or code, is received by the serverless platform 202, the request 214 may need to be serviced by a specific type of container (e.g., with the runtime needed to execute the function, written in a certain programming language). Thus, before the request 214 is forwarded to the serverless platform 204, embodiments of the invention may ensure that the container identified in the container table 210 is capable and/or compatible with the request 214.

Each of the serverless platforms 202, 204, and 206 may communicate container information to the container table 210. The container table 210 may include a list of active or running containers. Thus, the container table 210 may include a list of running containers on the serverless platform 202, a list of running containers on the serverless platform 204, and a list of running containers on the serverless platform 206.

In one example, each of these lists may only include running containers that have been specifically exposed by the corresponding serverless platform. For example, the serverless platform 202 may have 10 running containers and may elect to expose three of those containers in the container table 210. This allows the serverless platforms 204 and 206 to determine and identify three running containers. As previously stated, information or metadata may be provided such that the compatibility of those three containers with relevant request or function.

If the serverless platform 204 receives a request and does not have a running container with a suitable runtime to service the request, the serverless platform 204 may query the container table 210 to determine if one of the other serverless platforms in the computing system 200 has the requisite running container that is compatible with the request. This allows the serverless platform 204 to transmit the request to another serverless platform and avoid the cost of instantiating the requisite container. In other words, the cold start is avoided.

As illustrated in FIG. 2, the client 218 has subscribed to or is associated with the serverless platform 202. The client 218 may generate a request 214 (at 1) that is directed to and received by the serverless platform 202. The serverless platform 202 may determine that the required container is not running in the serverless platform and read the container table 210 (at 2). This information allows the serverless platform 202 to determine that the requisite container is running on the serverless platform 204 and transfer (at 3) the request 214 to the serverless platform 204 for execution. The serverless platform 204 executes the request 214 and returns (at 4) a response 216 to the client 218. In another example, the response may be returned via the serverless platform 202, which received the original request.

Figure 3:
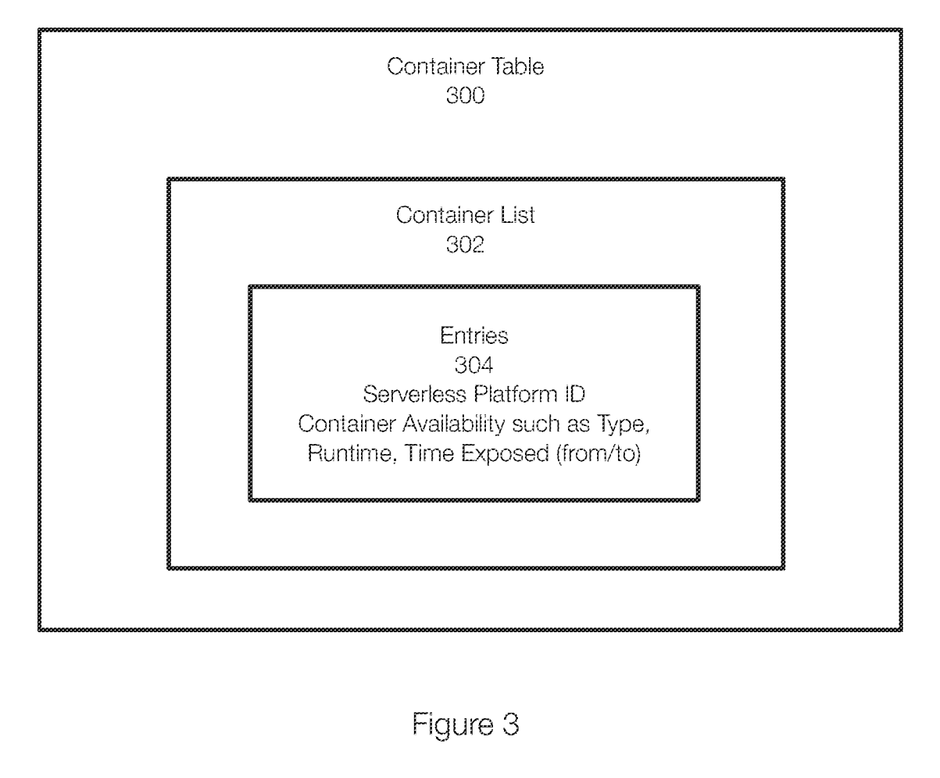
FIG. 3 discloses aspects of a container table storing information about containers available at multiple serverless platforms.

FIG. 3 discloses aspects of a container table. The container table 300, an example of the container table 210) may be organized or formatted in different manners. The container table 300 may include a container list 302. The list 302 may include entries 304. Each entry 304 may be associated with a specific warm container. Each entry 304 may identify or include metadata such as the serverless platform identifier (ID) and container availability information such as container type, runtime, and time exposed ($T_{Exposed}$). The time exposed may be bounded by times (e.g., to, from). When the from time is passed, the container is no longer exposed or available.

Returning to FIG. 2, each of the serverless platforms 202, 204, and 206 can read and update the container table 210. The container table 210 may be read to determine the warm or running containers that are available at other serverless platforms. The container table 210 is updated to keep the availability information current. For example, when the serverless platform 204 decides to expose a warm or running container, the container table 210 is updated accordingly. When the serverless platform 204 decides to terminate the container or the exposure, the entry may be removed from the container table 210.

Figure 4:
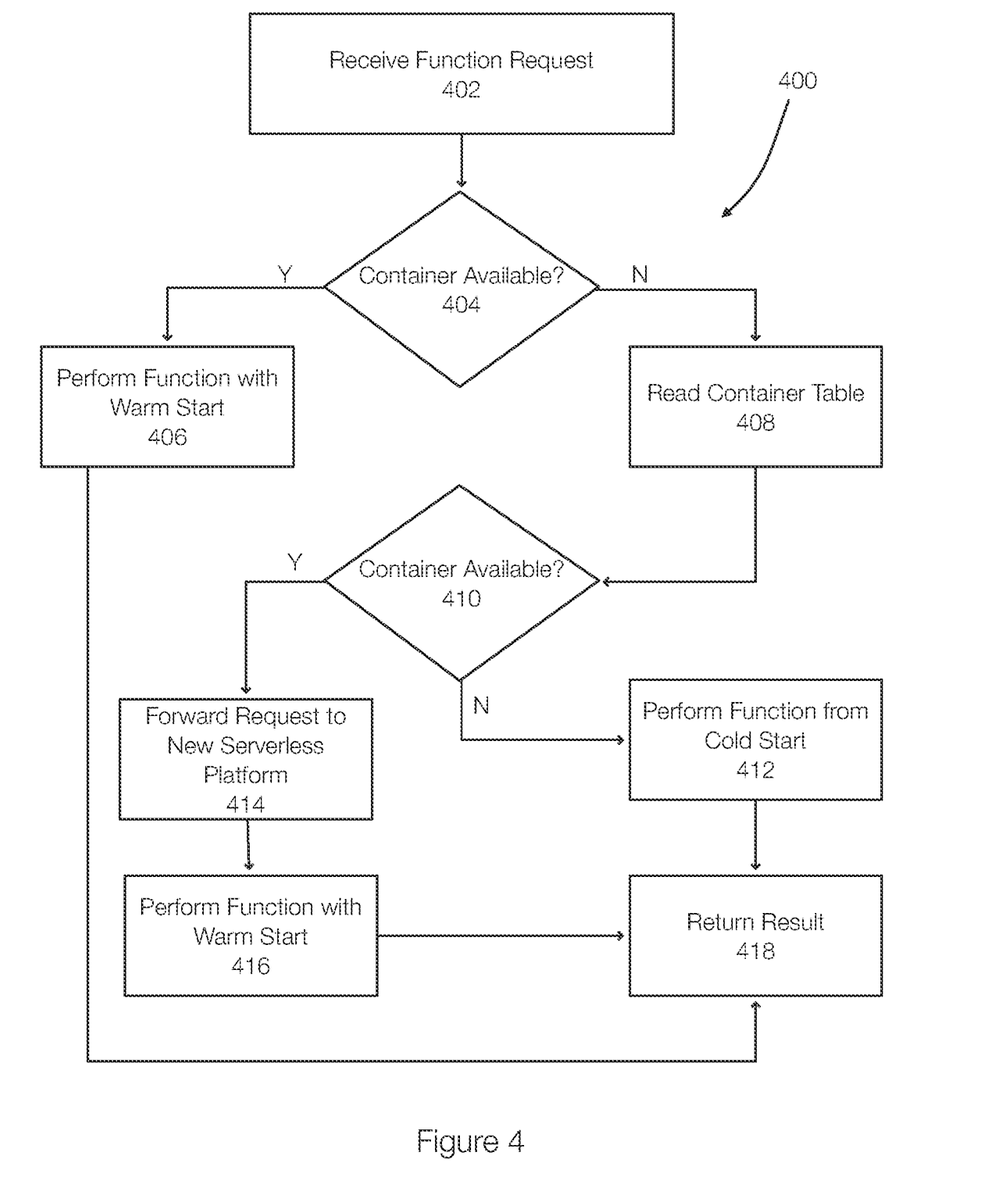
FIG. 4 discloses aspects of performing a request while mitigating cold start penalties.

FIG. 4 discloses aspects of mitigating function response times, such as cold start penalties, in serverless platforms. The method 400 may initially receive 402 a function request from a client. The client may be a device such as a computer, a tablet, a smartphone, or the like and the request may be generated as part of an application operating on a device or system or in response to a user's actions. The client or user may also be a server computer or other device. The request is received at a serverless platform.

Once the request is received, the serverless platform determines 404 whether a warm container (e.g., an instantiated and/or compatible running container with a suitable runtime) is available to perform the function request. If a warm container is available (Y at 404), the function is performed 406 with a warm start and a result is returned 418 to the requesting client.

If a warm container is not available at the receiving serverless platform (N at 404) the container table is read 408. Reading the table allows the serverless platform to determine whether a compatible warm container is available at a different serverless platform. If a warm container is not available (N at 410), the initial receiving serverless platform performs 412 the function using a cold start and returns 418 a result to the requesting client.

If a compatible warm container is available at another serverless platform (Y at 410), the function request is forwarded 414 to that serverless platform and the function is performed 416 with a warm container. Once completed, the result is returned 418 to the client.

By avoiding a cold start when possible, the client is likely to receive the result or response more quickly than when the cold start penalty is incurred. This is typically true even when the function request is forwarded to a different serverless platform, particularly when the serverless platforms are at the same location and share the same network.

Figure 5:
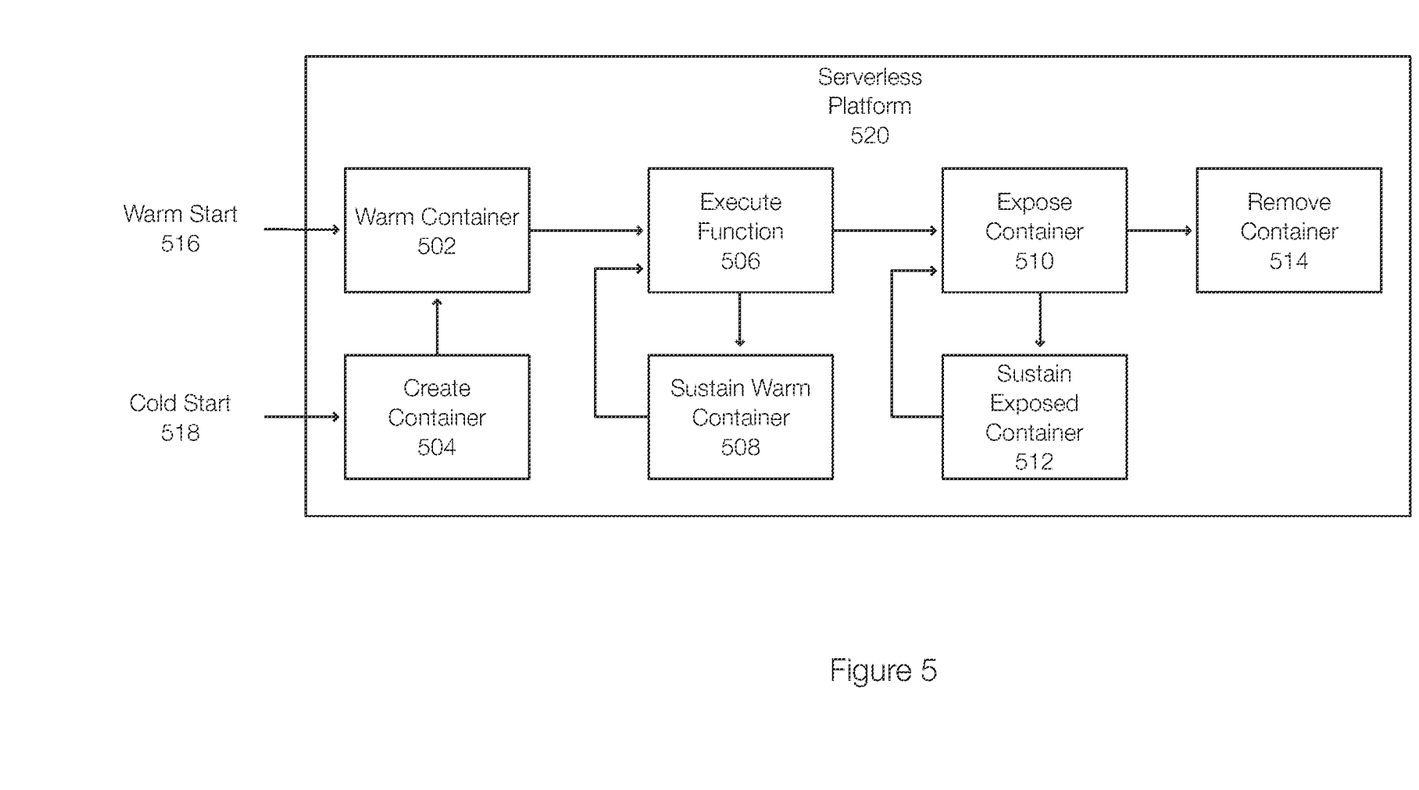
FIG. 5 discloses aspects of exposing a serverless platform's containers to other serverless platforms.

FIG. 5 discloses aspects of exposing a warm container to other serverless platforms. FIG. 5 illustrates a warm start 516, during which a function is provided to a warm container 502 operating on a serverless platform 520. FIG. 5 also illustrates a cold start 518. For the cold start 518, the warm container 502 does not exist in the serverless platform 520. As a result, for the cold start 518, a container is created 504 and results in the warm container 502.

Next, the function is executed 506 by the warm container 502. After the function is executed, the warm container is sustained 508 at the serverless platform 520. In one example, the warm container is sustained for a time $T_{warm}$. Sustaining the warm container for a period of time ensures that a warm container is available to execute any new request from the subscribed user that arrives shortly after the first request. As long as $t<T_{warm}$, the container is sustained 508 at the serverless platform 520.

Once $t=T_{warm}$, the container may be exposed 510 to other serverless platforms. Exposing the container includes updating a container table to make the other serverless platforms aware of the warm container 502 on the serverless platform. The other serverless platforms become aware of the exposed warm container by reading the container table. The warm container 502 is exposed by the serverless platform 520 until $t=T_{expose}$. In other words, the exposed warm container 502 is sustained in the container table and in the serverless platform 520 while $T_{warm}<t<T_{expose}$. Once $t=T_{expose}$, the warm container 502 may be removed from the container table (e.g., by the serverless platform 520 updating the container table) and the warm container 502 may be removed or terminated in the serverless platform 520.

Alternatively, the warm container may be exposed concurrently with instantiation in the serverless platform 520 and be exposed to other serverless platforms until removed by the serverless platform 520.

Embodiments of the invention thus provide a shared repository containing metadata (e.g., the container table) regarding warm containers that are available and can be used by multiple serverless platforms. In one example, the lifetime or life cycle of a warm container may be extended to include time allowed for exposing the container in a warm state. This may be system-defined or user defined in some examples. Additionally, the flow of a function request is augmented to allow function requests or invocations to be forwarded to another serverless platform. In some embodiments, the serverless platforms may also be trusted with respect to each other.

In one example, an experiment was conducted to demonstrate that an open source, serverless platform can execute a function that originates from an external source, potentially another serverless framework, which may also be open source. The OpenFaaS framework and a Python function were used in the experiment.

Figure 6:
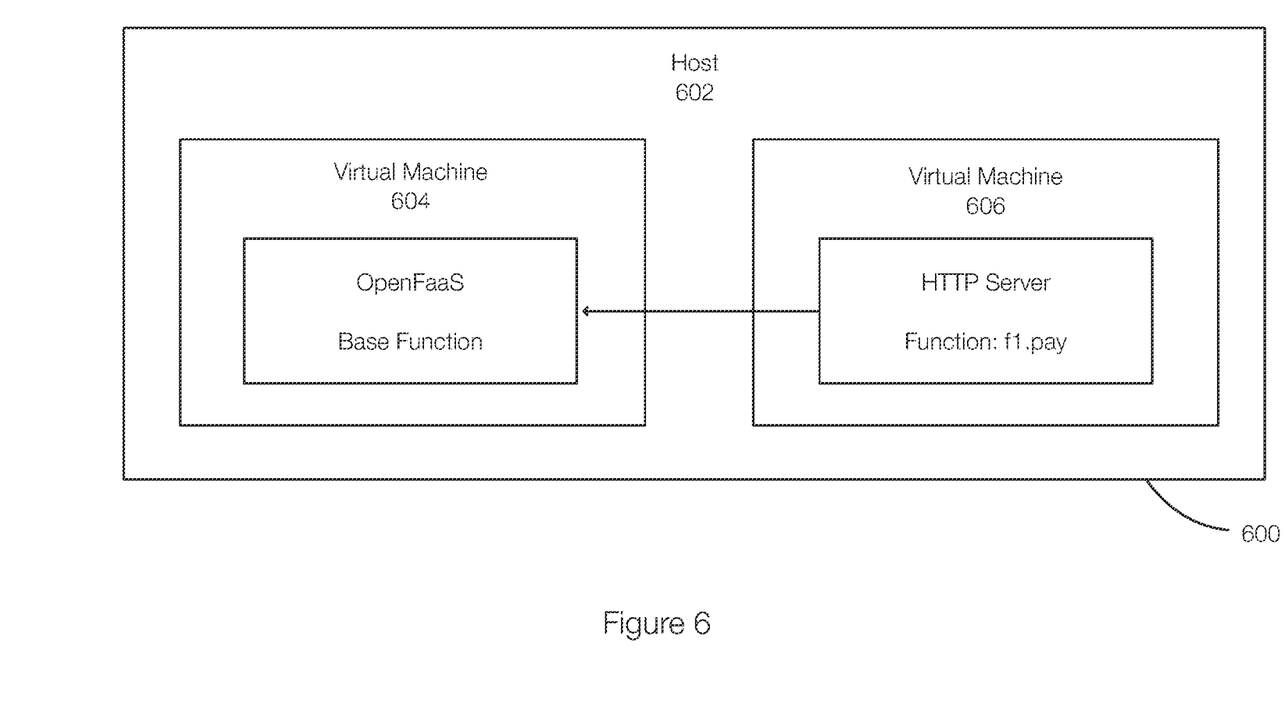
FIG. 6 discloses aspects of performing a request at a serverless platform other than the serverless platform that received the request.

FIG. 6 illustrates a test configuration 600 that includes OpenFaas running on a virtual machine 604 and an HTTP server running on a virtual machine 606. The virtual machines 604 and 606 are on the same host 602, which may be running an operating system. Thus, the OpenFaaS and the HTTP server are running on separate virtual machines within the same hosts 602.

The experiment proceeds as follows:
1. After starting OpenFaaS, a new container is created, and a base Python function is loaded.
   The role of the base function is a connection to the HTTP server, pulling and executing the test function f1.py on the warm container operating in the OpenFaaS.
2. Timestamp $T_1$.
3. The OpenFaaS loads the new code—f1.py—from external source—the HTTP server.
4. The OpenFaaS executes new code—f1.py.
5. Timestamp $T_2$.
6. Record time: $\Delta T = T_2 - T_1$.
7. Modify code—changes in f1.py on the HTTP server.
8. Return to step 0 (loop).
9. Report $\Delta T$ times.

The code was modified each time to illustrate that the OpenFaaS executes new code from the HTTP server. In this example, the code has been reloaded and the time has been measured several times.

The $\Delta T$s reported were approximately ~0.1 seconds. The $\Delta T$ of a cold start was approximately ~1 s. This demonstrates that the cold start penalty can be mitigated by seeking and using warm containers on other serverless platforms.

The experiment demonstrates that a serverless platform or framework such as OpenFaaS can accept a request and load new code from an external source such as an HTTP server. This is possible due to the platforms having a common unit of execution such as a container. This also demonstrates that cold starts can be avoided.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, serverless platform operations, FaaS operations, warm container exposure operations, function execution across serverless platforms operations, or the like. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: receiving a request at a serverless platform from a client, determining whether the serverless platform has a warm execution unit to perform the request, performing the request with the warm execution unit when present, wherein the serverless platform transmits the request to a second serverless platform that has an instance of the warm execution unit to perform the request when the warm execution unit is not present at the serverless platform, and returning a response to the client after the request is performed.

Embodiment 2. The method of embodiment 1, wherein the request includes a function and wherein the serverless platform comprises a function as a service.

Embodiment 3. The method of embodiment 1 and/or 2, further comprising performing the request by the instance of the warm execution unit at the second serverless platform.

Embodiment 4. The method of embodiment 1, 2, and/or 3, further comprising accessing a container table to determine whether the second warm execution unit is present on other serverless platforms including the second serverless platform.

Embodiment 5. The method of embodiment 1, 2, 3, and/or 4, further comprising cold starting an execution unit to perform the request at the serverless platform when the second warm execution unit is not available.

Embodiment 6. The method of embodiment 1, 2, 3, 4, and/or 5, wherein the ware execution unit comprises a warm container.

Embodiment 7. The method of embodiment 1, 2, 3, 4, 5, and/or 6, further comprising running the warm container for a first time period.

Embodiment 8. The method of embodiment 1, 2, 3, 4, 5, 6, and/or 7, further comprising updating a container table with metadata for the warm container such that the warm container is available to other serverless platforms.

Embodiment 9. The method of embodiment 1, 2, 3, 4, 5, 6, 7, and/or 8, further comprising removing the metadata for the warm container from the container table after an exposure time is reached.

Embodiment 10. The method of embodiment 1, 2, 3, 4, 5, 6, 7, 8, and/or 9, further comprising returning the response by the serverless platform that received the request or by the second serverless platform that performed the request.

Embodiment 11. A method for performing any of the operations, methods, or processes, or any portion of any of these, and/or any combination thereof disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the terms client, module, engine, agent, and component may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
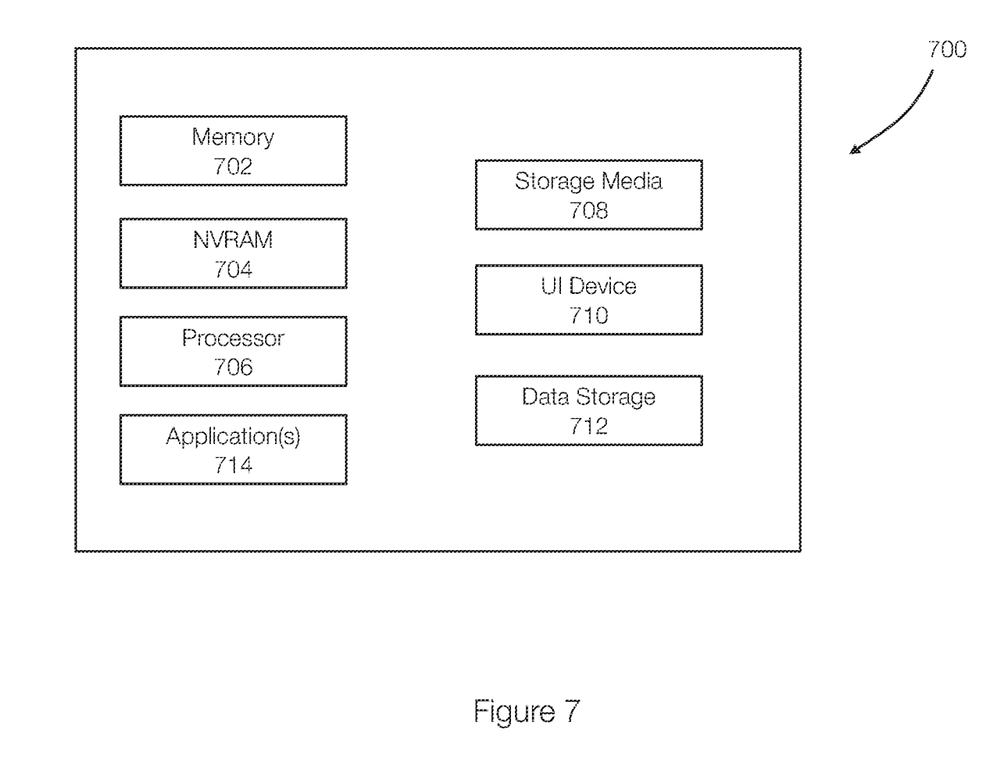
FIG. 7 discloses aspects of a computing device, system, or entity.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random-access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid-state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
receiving a request at a serverless platform from a client;
determining whether the serverless platform has an instance of a execution unit running on the serverless platform to perform the request;
performing the request with the instance of the execution unit when the instance of the execution unit is present and running on serverless platform,
wherein the serverless platform, when the instance of the execution unit is not present and not running on the serverless platform, accesses a container table to determine whether a second instance of the execution unit is running on a second serverless platform and transmits the request to the second serverless platform when the second instance of the execution unit is running at the second serverless platform; and
returning a response to the client after the request is performed,
wherein the container table identifies instances of execution units that are present and running on serverless platforms, wherein the serverless platforms represented in the container table includes the serverless platform and the second serverless platform.

2. The method of claim 1, wherein the request includes a function and wherein the serverless platform comprises a function as a service.

3. The method of claim 2, further comprising performing the request by the second instance of the execution unit at the second serverless platform.

4. The method of claim 1, further comprising accessing the container table to determine whether other instances of the execution unit are present on the serverless platforms identified in the container table, wherein the container table reports information about the second instance of the execution unit including a runtime of the second instance of execution unit.

5. The method of claim 4, further comprising cold starting an instance of the execution unit to perform the request at the serverless platform when the second instance of the execution unit is not available.

6. The method of claim 1, wherein the instance of the execution unit comprises a warm container.

7. The method of claim 6, further comprising running the warm container for a first time period.

8. The method of claim 7, further comprising updating the container table with metadata for the warm container such that the warm container is available to all serverless platforms identified in the container table.

9. The method of claim 8, further comprising removing the metadata for the warm container from the container table after an exposure time is reached.

10. The method of claim 9, further comprising returning the response by the serverless platform that received the request or by the second serverless platform that performed the request.

11. A non-transitory storage medium having stored therein instructions that are executable by one or more hardware processors to perform operations comprising:
receiving a request at a serverless platform from a client;
determining whether the serverless platform has an instance of a execution unit running to perform the request;
performing the request with the instance of the execution unit when the instance of the execution unit is present and running on serverless platform,
wherein the serverless platform, when the instance of the execution unit is not present and not running on the serverless platform, accesses a container table to determine whether a second instance of the execution unit is running on a second serverless platform and transmits the request to the second serverless platform when the second instance of the execution unit is running at the second serverless platform; and
returning a response to the client after the request is performed,
wherein the container table identifies instances of execution units that are present and running on other serverless platforms, wherein the serverless platforms represented in the container table includes the serverless platform and the second serverless platform.

12. The non-transitory storage medium of claim 11, wherein the request includes a function and wherein the serverless platform comprises a function as a service.

13. The non-transitory storage medium of claim 12, further comprising performing the request by the second instance of the execution unit at the second serverless platform.

14. The non-transitory storage medium of claim 11, further comprising accessing the container table to determine whether other instances of the warm execution unit are present on the serverless platforms identified in the container table, wherein the container table reports information about the second warm instance of the warm execution unit including a runtime of the second instance of the warm execution unit.

15. The non-transitory storage medium of claim 14, further comprising cold starting an instance of the execution unit to perform the request at the serverless platform when the second instance of the execution unit is not available.

16. The non-transitory storage medium of claim 11, wherein the instance of the execution unit comprises a warm container.

17. The non-transitory storage medium of claim 16, further comprising running the warm container for a first time period.

18. The non-transitory storage medium of claim 17, further comprising updating the container table with metadata for the warm container such that the warm container is available to all serverless platforms identified in the container table.

19. The non-transitory storage medium of claim 18, further comprising removing the metadata for the warm container from the container table after an exposure time is reached.

20. The non-transitory storage medium of claim 19, further comprising returning the response by the serverless platform that received the request or by the second serverless platform that performed the request.

* * * * *